(12) United States Patent
Suzuki et al.

(10) Patent No.: US 9,416,460 B2
(45) Date of Patent: Aug. 16, 2016

(54) STEEL SHEET FOR CONTAINERS

(75) Inventors: Takeshi Suzuki, Chiba (JP); Norihiko Nakamura, Chiba (JP); Yuka Miyamoto, Kanagawa (JP); Yoichi Tobiyama, Okayama (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 13/823,152

(22) PCT Filed: Sep. 14, 2011

(86) PCT No.: PCT/JP2011/070985
§ 371 (c)(1),
(2), (4) Date: Apr. 26, 2013

(87) PCT Pub. No.: WO2012/036204
PCT Pub. Date: Mar. 22, 2012

(65) Prior Publication Data
US 2013/0209829 A1  Aug. 15, 2013

(30) Foreign Application Priority Data

Sep. 15, 2010 (JP) ................... 2010-207343

(51) Int. Cl.

| | |
|---|---|
| *C25D 11/00* | (2006.01) |
| *C25D 11/36* | (2006.01) |
| *C25D 7/06* | (2006.01) |
| *B32B 15/04* | (2006.01) |
| *B32B 15/08* | (2006.01) |
| *B32B 15/18* | (2006.01) |
| *C23C 28/00* | (2006.01) |
| *C23C 22/36* | (2006.01) |
| *C23C 22/00* | (2006.01) |

(Continued)

(52) U.S. Cl.
CPC .............. *C25D 11/00* (2013.01); *B32B 15/013* (2013.01); *B32B 15/015* (2013.01); *C21D 8/0278* (2013.01); *C23C 22/00* (2013.01); *C23C 22/05* (2013.01); *C23C 22/34* (2013.01); *C23C 22/36* (2013.01); *C23C 28/00* (2013.01); *C23C 28/32* (2013.01); *C23C 28/321* (2013.01); *C23C 28/322* (2013.01); *C23C 28/34* (2013.01); *C23C 28/345* (2013.01); *C23C 30/00* (2013.01); *C23C 30/005* (2013.01); *C25D 5/12* (2013.01); *C25D 5/505* (2013.01); *C25D 7/0614* (2013.01); *C25D 9/08* (2013.01); *C25D 11/36* (2013.01); *Y10T 428/12535* (2015.01); *Y10T 428/12556* (2015.01); *Y10T 428/12569* (2015.01); *Y10T 428/12597* (2015.01); *Y10T 428/12604* (2015.01); *Y10T 428/12611* (2015.01); *Y10T 428/12618* (2015.01); *Y10T 428/12708* (2015.01); *Y10T 428/12722* (2015.01); *Y10T 428/12944* (2015.01); *Y10T 428/12958* (2015.01); *Y10T 428/12972* (2015.01); *Y10T 428/2495* (2015.01); *Y10T 428/24967* (2015.01); *Y10T 428/254* (2015.01); *Y10T 428/256* (2015.01); *Y10T 428/265* (2015.01); *Y10T 428/27* (2015.01)

(58) Field of Classification Search
CPC ...... B32B 15/04; B32B 15/043; B32B 15/18; B32B 2439/00; B32B 15/013; B32B 15/015; C23C 28/00; C23C 22/34; C23C 28/34; C23C 28/321; C23C 28/32; C23C 28/322; C23C 22/36; C23C 22/00; C23C 22/05; C23C 28/345; C23C 30/00; C23C 30/005; C23C 2222/00; Y10T 428/256; Y10T 428/12569; Y10T 428/12535; Y10T 428/254; Y10T 428/12556; Y10T 428/12597; Y10T 428/12604; Y10T 428/12611; Y10T 428/12618; Y10T 428/12944; Y10T 428/12958; Y10T 428/12972; Y10T 428/12722; Y10T 428/27; Y10T 428/265; Y10T 428/2495; Y10T 428/24967; Y10T 428/12708
USPC .......... 428/626, 327, 328, 621, 632, 633, 639, 428/646, 648, 680, 684, 679, 685, 660, 341, 428/340, 219
See application file for complete search history.

(56) References Cited

U.S. PATENT DOCUMENTS 3,791,850 A * 2/1974 Deshay et al. ................ 428/328

FOREIGN PATENT DOCUMENTS

| EP | 2006416 | 12/2008 |
|---|---|---|
| EP | 2071055 | 6/2009 |

(Continued)

OTHER PUBLICATIONS

International Search Report PCT/JP2011/070985 dated Dec. 20, 2011, with English translation.
Chinese Official Action—201180044320.1—May 6, 2014.
VN Office Action, dated Oct. 26, 2015; Application No. 1-2013-00808.

*Primary Examiner* — Michael E La Villa
(74) *Attorney, Agent, or Firm* — Young & Thompson

(57) ABSTRACT

Disclosed is a steel sheet for containers that maintains excellent corrosion resistance even when a surface treatment that replaces a chromate treatment has been conducted, and that has excellent film adhesion qualities and appearance. This steel plate for containers has, on at least one surface thereof, a chemical conversion coating including at least two coatings selected from a zirconium coating that contains zirconium and has a metal zirconium content of 0.1-9 mg/m$^2$, a phosphate coating that contains phosphoric acid and has a phosphorous content of 0.1-8 mg/m$^2$, and a phenolic resin coating that contains phenolic resin in an amount of 0.5-8 mg/m$^2$ in terms of carbon, the percentage of the area of the surface of the chemical conversion coating layer having particles Of a prescribed size being 0.1-50%.

1 Claim, No Drawings

(51) Int. Cl.

| | |
|---|---|
| *C23C 22/05* | (2006.01) |
| *C23C 30/00* | (2006.01) |
| *C25D 5/12* | (2006.01) |
| *C25D 5/50* | (2006.01) |
| *C23C 22/34* | (2006.01) |
| *C25D 9/08* | (2006.01) |
| *B32B 15/01* | (2006.01) |
| *C21D 8/02* | (2006.01) |

(56) References Cited

FOREIGN PATENT DOCUMENTS

| JP | 2000-239855 | 9/2000 |
| JP | 2009-001851 | 1/2009 |
| JP | 2009-001853 | 1/2009 |
| JP | 2009-001854 | 1/2009 |
| WO | 2007111354 | 10/2007 |
| WO | 2008029916 | 3/2008 |

* cited by examiner

STEEL SHEET FOR CONTAINERS

The present invention relates to a steel sheet for containers.

BACKGROUND ART

A number of containers used for containing beverages and foods are metal containers made from steel sheets such as nickel-plated steel sheets, tin-plated steel sheets, or tin-based-alloy-plated steel sheets. These metal containers need to be painted before or after the can-making process. In recent years, film lamination has taken the place of painting in a number of cases in the manufacture of such metal containers to reduce waste resulting from painting materials such as waste solvents and waste gases such as carbon dioxide from the viewpoint of global environment conservation.

Steel sheets for containers used as a base for painting or film lamination are often steel sheets treated against corrosion by chromating using, for example, hexavalent chromate to ensure corrosion resistance and adhesion between a steel sheet and paint or film (see, for example, Patent Literature 1). These chromate-treated steel sheets are further provided, where necessary, with a coating layer of organic resin disposed on the chromate treatment coating.

However, because hexavalent chromium used for chromate treatment is harmful to the environment, recently there has been a trend toward replacing the chromate treatment hitherto applied to steel sheets for containers. In contrast, because the chromate coating formed by the chromate treatment on a steel sheet has an enhanced level of corrosion resistance and adhesion to paint for film), these properties are expected to significantly decrease without such chromate treatment. Therefore, there is a now a trend toward performing anti-corrosion treatment on the surface of a steel sheet for containers in lieu of chromate treatment in order to form an anti-corrosion layer having good corrosion resistance and adhesion to paint (or film). Among the anti-corrosion treatments that have been proposed to replace the chromate treatment, there have been proposed the following surface treatment methods.

Patent Literatures 2 and 3, for example, each propose a steel sheet for containers having, on at least one side of the steel sheet, a chemical conversion coating layer comprising at least two kinds of coatings selected from the group consisting of a zirconium coating containing a given amount of zirconium, a phosphoric acid coating containing a given amount of phosphoric acid, and a phenolic resin coating containing a given amount of phenolic resin, wherein any given particle in the chemical conversion coating layer has a size not larger than a given value.

CITATION LIST

Patent Literature

Patent Literature 1: JP 2000-239855 A;
Patent Literature 2: JP 2009-1851 A;
Patent Literature 3: JP 2009-1853 A;

SUMMARY OF INVENTION

Technical Problems

In the beverage container market, competition in terms of quality between steel sheets for containers and such materials as polyethylene terephthalate, glass, and paper is becoming stronger, and thus steel sheets for containers also are now required to have better adhesion to organic resin (e.g., film adhesion). In particular, the film on the neck portion of a can subjected to necking is generally liable to become detached and, hence, there has been a demand for a steel sheet for containers in which detachment of the film in such a portion does not occur under harsh conditions.

The inventors of the present invention studied film adhesion in the neck portion using the steel sheets described in Patent Literature 2 and 3 and found that the levels of adhesion have not reached currently required levels and that there is still room for improvement.

Because of the increased importance placed on the external aesthetic appearance of products by consumers, the requirements on the appearance of cans have been raised to an even higher level. In particular, a brighter color tone is generally preferred to a darker color tone on steel sheet surfaces in consideration of the impression made by printed external surfaces of cans.

In view of the above circumstances, an object of the present invention is to provide a steel sheet for containers exhibiting excellent film adhesion and external properties while maintaining excellent corrosion resistance even when subjected to surface treatment that is a replacement for chromate treatment.

Solution to Problems

The inventors of the present invention carried out studies to solve the above problems and found that the above problems can be solved by using a chemical conversion coating layer containing particles having a given size.

Accordingly, the inventors of the present invention found that the problems can be solved by adopting the features described below.

(1) A steel sheet for containers comprising, on at least one side of the steel sheet, a chemical conversion coating layer including at least two kinds of coatings selected from the group consisting of a zirconium coating containing 0.1 mg/m$^2$ to 9 mg/m$^2$ of zirconium in terms of zirconium metal, a phosphoric acid coating containing 0.1 mg/m$^2$ to 8 mg/m$^2$ of phosphoric acid in terms of phosphorus, and a phenolic resin coating containing 0.05 mg/m$^2$ to 8 mg/m$^2$ of phenolic resin in terms of carbon, wherein the area ratio of particles satisfying (a+b)/2>200 (nm) at the surface of the chemical conversion coating layer is 0.1 W to 50%, where a (nm) is the length of the major axis, which is the line segment having the maximum length among line segments each connecting one end and another end of any given particle in the chemical conversion coating layer, and b (nm) is the length of the minor axis, which is the line segment having the maximum length among line segments connecting one end and another end of the particle and crossing the major axis at right angles.

(2) The steel sheet for containers according to (1), wherein the steel sheet is a plated steel sheet comprising a base nickel layer formed by providing a nickel plating or an iron-nickel alloy plating on a surface of the steel sheet and a tin plating layer containing tin islands where part of a tin plating provided on the base nickel layer is alloyed with part or the whole of the base nickel layer.

(3) The steel sheet for containers according to (2), wherein the base nickel layer contains 5 mg/m$^2$ to 150 mg/m$^2$ of nickel in terms of nickel metal and the tin plating layer contains 300 mg/m$^2$ to 3000 mg/m$^2$ of tin in terms of tin metal, and wherein part of the tin plating is alloyed with part or the whole of the base nickel layer by tin melting treatment.

(4) The steel sheet for containers according to (1), wherein the steel sheet comprises a tin plating layer on at least one side thereof, and wherein the tin plating layer is provided thereon with the chemical conversion coating layer.

(5) The steel sheet for containers according to (4), wherein the tin plating layer contains 100 mg/m² to 5600 mg/m² of tin in terms of tin metal.

(6) The steel sheet for containers according to (1), wherein the steel sheet comprises on at least one side thereof a nickel plating layer containing 10 mg/m² to 1000 mg/m² of nickel in terms of nickel metal, and wherein the nickel plating layer is provided thereon with the chemical conversion coating layer.

(7) The steel sheet for containers according to any one of (1) to (6), wherein the chemical conversion coating layer includes at least the zirconium coating.

(8) The steel sheet for containers according to any one of (1) to (7), wherein the chemical conversion coating layer includes the zirconium coating, the phosphoric acid coating, and the phenolic resin coating.

Advantageous Effects of Invention

The present invention can provide a steel sheet for containers exhibiting excellent film adhesion and external properties while maintaining an excellent corrosion resistance even when applied with surface treatment that is a replacement for chromate treatment.

DESCRIPTION OF EMBODIMENTS

A steel sheet for containers of the invention is described in detail below.

More specifically, the steel sheet for containers of the invention comprises, on at least one side thereof, a chemical conversion coating layer including at least two kinds of coatings selected from the group consisting of a zirconium coating containing 0.1 mg/m² to 9 mg/m² of zirconium in terms of zirconium metal, a phosphoric acid coating containing 0.1 mg/m² to 8 mg/m² of phosphoric acid in terms of phosphorus, and a phenolic resin coating containing 0.05 mg/m² to 8 mg/m² of phenolic resin in terms of carbon.

First, the steel sheet and the chemical conversion coating layer constituting part of the steel sheet for containers are described.

<Steel Sheets>

A steel sheet used as material sheet for the steel sheet for containers of the invention is not specifically limited and may be any appropriate steel sheet that is normally used as a material for containers. The manufacturing method and the properties of the material sheet are also not specifically limited: the material sheet may be manufactured by a process starting with a normal billet producing step followed by such steps as hot rolling, pickling, cold rolling, annealing, and temper rolling; the steel sheet may be provided on the surface thereof with a metal surface treatment layer such as a chemical conversion treatment layer or a plating layer. The method for providing the surface treatment layer includes but is not limited to such known methods as electroplating, vacuum deposition, and sputtering, to which heat treatment for providing a diffusion layer may be added.

The surface of the steel sheet may be provided with a metal surface treatment layer and, for securing corrosion resistance as required of containers, a base plating layer described later is preferably provided.

Base plating layers that may be preferably used in the present invention are described below.

(Composite Plating Layer Consisting of Base Nickel Layer and Tin Plating Layer)

Described first as an example of the above base plating layer is a composite plating layer comprising a base nickel layer provided on the surface of a steel sheet and a tin island plating layer formed on the base nickel layer.

The base nickel layer herein is a plating layer containing nickel formed on at least one side of the steel sheet and may be a nickel metal plating layer of nickel metal or an iron-nickel alloy plating layer formed of iron-nickel alloy plating. The tin island plating layer is preferably an alloy plating layer formed by providing tin plating on the base nickel layer and allowing part or the whole of the base nickel layer to alloy with part of the tin plating layer through tin melting treatment. Because it is difficult to form a tin island coating as described above by providing tin plating on a plating layer composed solely of nickel and applying tin melting treatment, an iron-nickel alloy plating layer is preferably used as the base nickel layer.

Such a nickel plating layer and tin island plating layer are described in detail below.

The base nickel layer composed of nickel or an iron-nickel alloy is provided to improve corrosion resistance. Because nickel is a high-corrosion-resistance metal, plating the surface of a steel sheet with nickel, as in the present invention, improves the corrosion resistance of an alloy layer containing iron and tin that is formed in tin melting treatment.

The effects of improving the corrosion resistance of an alloy layer achieved by nickel plating depends on the amount of applied nickel; when the amount of nickel metal in the base nickel layer is 5 mg/m² or more, the effects of improved corrosion resistance significantly increase. The effects of improved corrosion resistance increase with the amount of nickel in the base nickel, layer, but when the amount of nickel in the base nickel layer exceeds 150 mg/m², not only are the effects of improved corrosion resistance saturated, but because nickel is an expensive metal, plating with nickel in an amount exceeding 150 mg/m² is disadvantageous from an economical viewpoint. Accordingly, the amount of nickel in the base nickel layer is preferably 5 mg/m² to 150 mg/m².

In the case where the base nickel layer is formed by diffusion plating, the surface of a steel sheet is plated with nickel, and subsequently diffusion treatment is performed in an annealing furnace to form a diffusion layer. Before or after the diffusion treatment or simultaneously therewith, nitriding may be performed. Even in the case where nitriding is performed, the effects of nickel as the base nickel layer and the effects of the nitriding treatment layer can be both produced without interference therebetween.

Plating with nickel and plating with an iron-nickel alloy can be performed by, for example, a known method employed in general for electroplating (e.g., cathode electrolysis).

The above nickel plating or iron-nickel plating is followed by tin plating. "Tin-plating" herein denotes not only plating with tin metal but plating with tin metal into which irreversible impurities have been mixed or tin metal to which trace amounts of elements have been added. Tin-plating may be carried out by any appropriate method that is not specifically limited and may be carried out by, for example, a known electroplating method or a method whereby a steel sheet is immersed in molten tin to achieve plating.

The tin plating layer formed by the tin plating described above is provided to improve corrosion resistance and weldability. Because tin per se has a high corrosion resistance, not only tin metal but a tin alloy formed by tin melting treatment (reflow treatment) described later can exhibit excellent corrosion resistance and weldability.

In this particular case, the tin plating layer is formed so as to contain tin islands. This is because, if the whole surface of a steel sheet were to be plated with tin, the steel sheet might be exposed to a temperature at the melting point (232° C.) or a higher temperature during heat treatment following film lamination or application of a paint, making it impossible to secure film adhesion because of melting of tin or oxidation of tin. Therefore, tin islands are formed, and the iron-nickel base, which corresponds to the sea area, is exposed (area which is not melted) to ensure film adhesion.

The excellent corrosion resistance of tin improves significantly from when the amount of tin metal is 300 mg/m$^2$ or more, and improves by a degree that also increases with the amount of tin included. Accordingly, the amount of tin metal in the tin plating layer containing tin islands is preferably 300 mg/m$^2$ or more. Further, because the effects of improving corrosion resistance become saturated when the amount of tin metal exceeds 3000 mg/m$^2$, the tin content is preferably not more than 3000 mg/m$^2$ from an economical viewpoint.

Tin, having a low electric resistance, is soft and expands when pressurized between electrodes during welding, and thus secures a stable energization region, thereby exhibiting excellent weldability. Such excellent weldability can be exhibited with an amount of tin metal of 100 mg/m$^2$ or more. In the above range of the amount of tin metal, where excellent corrosion resistance is exhibited, the effects of improving weldability is not saturated. Accordingly, to secure excellent corrosion resistance and weldability, the amount of tin metal is preferably in a range not less than 300 mg/m$^2$ and not more than 3000 mg/m$^2$.

The above tin plating is followed by tin melting treatment (reflow treatment). The tin melting treatment is performed to melt tin, alloy molten tin with a base steel sheet or a base metal (e.g., base nickel layer) and form a tin-iron alloy layer or a tin-iron-nickel alloy layer thereby to improve the corrosion resistance of the alloy layer and also form tin alloy islands. The tin alloy islands can be formed by appropriately controlling tin melting treatment (Tin Plating Layer)

Secondly, as an example of the above base plating layer, a tin plating layer (tin plating layer not containing tin islands) formed on at least one side of a steel sheet is described.

While tin has excellent formability, weldability, and corrosion resistance, in order to obtain sufficient corrosion resistance with tin plating alone, the amount of tin metal is preferably, for example, 100 mg/m$^2$ or more. The corrosion resistance increases with the amount of tin metal but in the case where tin plating alone is applied, the effects of improving corrosion resistance are saturated when the amount of tin metal exceeds 5600 mg/m$^2$. Accordingly, where tin plating alone is applied, the amount of tin metal is preferably 5600 mg/m$^2$ or less from an economical viewpoint. Performing tin melting treatment after tin plating as in the above case, enables formation of an iron-tin alloy layer with the iron in the steel sheet, imparts luster, and further improves corrosion resistance.

From a viewpoint of, for example, improving the corrosion resistance, the above composite plating layer or tin plating layer is preferably formed on both sides of the steel sheet. Where the steel sheet is provided on one side thereof with, for example, a surface treatment layer other than the composite plating layer or the tin plating layer for improving, for example, corrosion resistance, the composite plating layer or the tin plating layer may be formed at least on the other side of the steel sheet from a viewpoint of, for example, reducing manufacturing costs. In the case where a steel sheet for containers having a composite plating layer or a tin plating layer formed on only one side thereof is machined and formed into a can, the machining is done so that, for example, the inside of the container as formed is the side on which the composite plating layer or the tin plating layer is formed.

(Nickel Plating Layer)

Thirdly, as an example of the above base plating layer, a nickel plating layer formed on at least one side of the steel sheet is described.

Because nickel is a high-corrosion-resistance metal, plating the surface of a steel sheet with nickel as is in the case of the steel sheet for containers of the invention further improves the corrosion resistance. An Fe—Ni alloy plating layer, obtained by alloying nickel with iron, may be provided.

The effects of improving corrosion resistance obtained by nickel plating depend on the amount of applied nickel; when the amount of nickel in the nickel plating layer is 10 mg/m$^2$ or more, the effects of improving corrosion resistance significantly increase. To secure sufficient corrosion resistance, the amount of nickel in the nickel plating layer is preferably 150 mg/m$^2$ or more.

The effects of improving corrosion resistance increase with the amount of nickel in the nickel plating layer, but when the amount of nickel exceeds 1000 mg/m$^2$, not only are the effects of improving corrosion resistance saturated, but because nickel is an expensive metal, plating with nickel in an amount exceeding 1000 mg/m$^2$ is disadvantageous from an economical viewpoint.

The nickel plating layer used in the invention is not limited to one composed of pure nickel metal, but may be composed of a nickel alloy, provided that the amount of nickel is in a range of 10 g/m$^2$ to 1000 mg/m$^2$. To improve the mechanical strength, the steel sheet may be subjected to nitriding treatment. Though the steel sheet subjected to nitriding has a nickel plating layer formed thereon, the effects obtained by nitriding such as reduced susceptibility to crushing and deforming despite of a reduced thickness of the steel sheet do not decrease.

Further, formation of the above nickel plating layer may be followed by heat treatment for providing a diffusion layer. Further still, where, for example, the nickel plating layer is formed by diffusion plating, nitriding may be performed before, after, or simultaneously with a diffusion treatment, which is performed in an annealing furnace to form a diffusion layer after the surface of the steel sheet has been plated with nickel.

From the viewpoint of improving the corrosion resistance, the above nickel plating layer is preferably formed on both sides of the steel sheet. Where the steel sheet is provided on one side thereof with, for example, a surface treatment other than nickel plating for improving corrosion resistance, the nickel plating layer may be formed at least on the other side of the steel sheet from the viewpoint of, for example, reducing manufacturing costs. In the case where a steel sheet for containers having a nickel plating layer formed on only one side thereof is machined and formed into a can, the machining is performed so that, for example, the inside of the container as formed is the side on which the nickel plating layer is formed.

(Method of Measuring Components)

The amount of Ni metal in the above Ni plating layer and the amount of Sn metal in the above Sn plating layer can be measured by, for example, a fluorescent X-ray method. In this case, a calibration curve representing the amount of Ni metal is previously determined using a sample having an amount of attached Ni for which the amount of Ni metal is known in order to relatively determine the amount of Ni metal using the calibration curve. Likewise with the amount of Sn metal, a calibration curve for the amount of Sn metal is previously determined using a sample showing an amount of attached Sn for which the amount of Sn metal is known in order to relatively determine the amount of Sn metal using the calibration curve.

<Chemical Conversion Coating Layer>

On the above steel sheet, a chemical conversion coating layer is formed. The chemical conversion coating layer includes at least two kinds of coatings selected from zirconium coating, phosphoric acid coating, and phenolic resin coating. The chemical conversion coating layer of the invention is described in detail below.

Where the chemical conversion coating layer formed is a coating comprising at least two kinds of components of Zr component, phosphoric acid component, and phenolic resin component, excellent properties of practical utility are exhibited. Where the chemical conversion coating layer is a coating comprising Zr component and at least one of the phosphoric acid component and the phenolic resin component, corrosion resistance and adhesion in particular can be improved among the excellent properties of practical utility. Furthermore, when the chemical conversion coating layer is a composite coating where Zr component, phosphoric acid component, and phenolic resin component are combined, yet still better adhesion can be exhibited. In particular in a range where the amount of coating is small, a composite coating composed of three kinds of coatings, i.e., Zr coating, phosphoric acid coating, and phenolic resin coating, exhibits performance with an increased consistency because the three coatings complement each other's properties.

(Size of Particles in Chemical Conversion Coating Layer)

As described above, the steel sheet for containers of the invention has a chemical conversion coating layer on at least one side of a steel sheet.

As for the particles contained in the chemical conversion coating layer (e.g., particles of a zirconium compound such as zirconium oxide and zirconium phosphate, where the chemical conversion coating layer contains a Zr component), the area ratio of particles satisfying $[(a+b)/2]>200$ (nm) (also referred to as particles A below, where appropriate) at the surface of the chemical conversion coating layer needs to be 0.1% to 50%, where a (nm) is the length of a line segment (hereinafter called "major axis") having a maximum length among the line segments each connecting one end a1 and another end a2 of any particle selected at random, and b (nm) is the length of a line segment (hereinafter called "minor axis") having a maximum length among the line segments each connecting one end b1 and another end b2 of that particle and crossing the major axis at right angles.

When the area ratio of particles A at the surface of the chemical conversion coating layer is 0.1% to 50%, an obtained steel sheet for containers exhibits still better film adhesion and external properties. When the area ratio of the particles A is less than 0.1%, the adhesion of the steel sheet for containers to organic resin decreases. When the area ratio of the particles A is over 50%, the color tone of the surface of the steel sheet darkens as visible light is scattered or absorbed by particles, causing the external properties of the steel sheet for containers to degrade.

From the viewpoint of film adhesion weighed against the color tone of the obtained steel sheet in particular, the area ratio of the particles A is preferably 1 to 20%, and more preferably 1% to 10%.

The upper limit of $[(a+b)/2]$ of the particles A is preferably 1000 nm or less, and more preferably 450 nm or less from the viewpoint of the obtained steel sheet's external properties and adhesion to organic resin. When the area ratio of the particles A beyond the above range exceeds 50%, the color tone is dark, which is undesirable.

Further, as the particle size increases, the strength of the particles themselves decreases, increasing the chances of cohesive failure occurring in the coating. Accordingly, for an excellent adhesion of the steel sheet for containers to organic resin, the size $[(a+b)/2]$ of the particles A is preferably 200 nm to 300 nm.

A zirconium coating having a particle structure with the size $[(a+b)/2]$ over 200 (nm) can be obtained through cathode electrolysis at a temperature of 20° C. to 50° C., under conditions described in detail below. The major axis a and the minor axis b in the present invention can be measured by observing the surface of the steel sheet for containers thus obtained by electrolysis with a scanning electron microscope (SEM). The magnification of the SEM is preferably about 30000×. Specifically, the major axis a and the minor axis b of any particle selected in an SEM photograph (a particle having a maximum size as visually observed must be included) of the surface of a steel sheet for containers are measured to determine actual values of the major axis a and the minor axis b by calculation using the magnification with which the SEM photograph was taken.

(Zirconium Coating)

The zirconium coating contained in the chemical conversion coating layer of the invention is formed to secure corrosion resistance and adhesion to organic resin (hereinafter referred to as "organic resin adhesion").

The zirconium coating is a coating composed of one kind of zirconium compound exemplified by zirconium oxide, zirconium hydroxide, zirconium fluoride, and zirconium phosphate, or a composite coating composed of two or more of such zirconium compounds.

Such a zirconium coating has excellent corrosion resistance and organic resin adhesion, and the present inventors think that the reason for this is as follows. The inventors infer that, as for corrosion resistance, the zirconium coating forms a three-dimensional cross-link structure of a polymeric zirconium complex, and the barrier characteristics of the cross-link structure provide corrosion resistance. As for adhesion, the inventors attribute the adhesion to the fact that the hydroxy existing inside the zirconium coating or the hydroxy of the phosphate group undergoes dehydration synthesis with the hydroxy existing in the metal surface of, for example, a steel sheet, causing covalent bonding to occur between the metal surface and the zirconium coating through oxygen atoms.

Specifically, an amount of attached zirconium coating reaching or exceeding 0.1 mg/m$^2$ in terms of zirconium metal secures a level of corrosion resistance and organic resin adhesion at which no practical problem is posed in use. While the effects of improving corrosion resistance and organic resin adhesion increase with the amount of attached zirconium coating, the zirconium coating becomes excessively thick when the amount of attached zirconium coating exceeds 9 mg/m$^2$ in terms of zirconium metal, possibly resulting in occurrence of cohesive failure during machining, which in turn leads to reduced adhesion of the zirconium coating itself and reduced adhesion thereof to the organic resin film, as well as increased electric resistance to lower the weldability. Further, when the amount of attached zirconium coating exceeds 9 mg/m$^2$ in terms of zirconium metal, uneven attachment of the coating may show on the exterior as an uneven external appearance, and the coating that has been deposited but that is not attached in a sufficient amount may be washed away (become detached) in the cleaning step following the electrolysis treatment.

Therefore, the amount of attached zirconium coating in the steel sheet for containers of the invention needs to be 0.1 mg/m$^2$ to 9 mg/m$^2$ in terms of zirconium metal. Preferably, the amount of attached zirconium coating is 1 mg/m$^2$ to 8 mg/m$^2$ in terms of zirconium metal. Where the amount of attached zirconium coating is held within a range of 1 mg/m$^2$ to 8 mg/m$^2$, corrosion resistance after retorting can be secured and minute inconsistencies in the amount of attached coating can be reduced.

(Phosphoric Acid Coating)

The phosphoric acid coating included in the above chemical conversion coating layer is formed to secure corrosion resistance and organic resin adhesion. The phosphoric acid coating is a coating composed of one kind of phosphate compound exemplified by iron phosphate, nickel phosphate, tin phosphate, zirconium phosphate, and phenol phosphate formed by reaction with the base (steel sheet, nickel plating layer, tin plating layer, zirconium coating, or phenolic resin coating) or a composite coating composed of two or more kinds of such phosphate compounds. The present inventors attribute the excellent corrosion resistance and organic resin adhesion of the phosphoric acid coating as described above to the fact that the phosphate ions undergo complexation with various metal ions to form a three-dimensional cross-link structure coating as earlier described and that although metal ions such as ions of iron and nickel are dissolved out (a first stage of corrosion), the metal ions are insolubilized as a phosphate compound is formed, which produces an effect of reducing further corrosion.

Specifically, an amount of attached phosphoric acid coating reaching or exceeding 0.1 mg/m$^2$ in terms of phosphorus secures a level of corrosion resistance and organic resin adhesion at which no problem is posed in practical use. While the effects of improving corrosion resistance and organic resin adhesion increase with the amount of attached phosphoric acid coating, the phosphoric acid coating becomes excessively thick when the amount of attached phosphoric acid coating exceeds 8 mg/m$^2$ in terms of phosphorus, possibly resulting in occurrence of cohesive failure at the time of machining, which in turn leads to reduced adhesion of the zirconium coating itself and reduced adhesion thereof to the film, as well as increased electrical resistance to lower the weldability. Further, when the amount of attached phosphoric acid coating exceeds 8 mg/m$^2$ in terms of phosphorus, uneven attachment of the coating may show on the exterior as an uneven external appearance, and furthermore the coating that has been deposited but whose attachment is not sufficient may be washed away (become detached) in the cleaning step following the electrolysis treatment.

Therefore, in the steel sheet for containers of the invention, the amount of attached phosphoric acid coating needs to be 0.1 mg/m$^2$ to 8 mg/m$^2$ in terms of phosphorus. Preferably, the amount of attached phosphoric acid coating is 1 mg/m$^2$ to 6 mg/m$^2$ in terms of phosphorus. Where the amount of attached phosphoric acid coating is held within a range of 1 mg/m$^2$ to 6 mg/m$^2$, corrosion resistance after retorting can be secured and minute inconsistencies in the amount of attached coating can be reduced.

(Phenolic Resin Coating)

As described above, the above chemical conversion coating layer may include a phenolic resin coating containing a phenolic resin component.

The phenolic resin coating is formed to secure organic resin adhesion. Because phenolic resin per se is organic matter, it has excellent adhesion to a laminate film made of organic matter.

Where machining is applied whereby the surface treatment layer is caused to deform significantly, the machining may cause cohesive failure in the surface treatment layer itself, possibly degrading the adhesion thereof, but phenolic resin produces effects of significantly improving formability and adhesion of a zirconium coating or a phosphoric acid coating when any of such coatings is included in the surface treatment layer.

Specifically, when the amount of attached phenolic resin coating is at least 0.05 mg/m$^2$ in terms of carbon, a level of organic resin adhesion is secured at which no problem is posed in practical use. On the other hand, as the amount of attached phenolic resin coating increases, so do the effects of improved organic resin adhesion, but when the amount of attached phenolic resin coating exceeds 8 mg/m$^2$ in terms of carbon, the phenolic resin coating has an excessively large thickness, reducing the adhesion of the phenolic resin coating itself, while the electric resistance increases so that the weldability decreases. Further, when the amount of attached phenolic resin coating exceeds 8 mg/m$^2$ in terms of carbon, uneven attachment of the coating may show on the exterior as an uneven external appearance, and furthermore the coating that has been deposited but that is not attached in a sufficient amount may be washed away (becomes detached) in the cleaning step following the electrolysis treatment.

Therefore, according to the steel sheet for containers of the invention, the amount of attached terms of carbon. Preferably, the amount of attached phenolic resin coating is 0.1 mg/m$^2$ to 6 mg/m$^2$ in terms of carbon. In the case where the amount of attached phenolic resin coating is held within a range of 0.1 mg/m$^2$ to 6 mg/m$^2$, not only can minute inconsistencies in attachment (yellowing due to attachment) be reduced, but the effects of the added phenol described above can be fully exhibited.

(Method of Measuring Contents of Components in Chemical Conversion Coating Layer)

The amounts of zirconium metal and phosphorus contained in the chemical conversion coating layer of the invention can be measured by, for example, quantitative analysis such as X-ray fluorescence spectrometry. The amount of carbon in the chemical conversion coating layer can be obtained by, for example, subtracting the amount of carbon contained in the steel sheet as background from a value obtained by total carbon measurement using gas chromatography.

As described above, the steel sheet for containers of the invention, provided with a chemical conversion coating layer including at least two kinds of coatings selected from zirconium coating, phosphoric acid coating, and phenolic resin coating on at least one side of the plated steel sheet as described above, can possess excellent film adhesion. In the case where the above chemical conversion coating layer includes at least a zirconium coating, corrosion resistance and film adhesion can be further improved. Further, where the above chemical conversion coating layer includes a zirconium coating, a phosphoric acid coating, and a phenolic resin coating, film adhesion can be improved significantly.

[Method of Producing Steel Sheet for Containers of the Invention]

Description of the steel sheet for containers of the invention has been made above with respect to the configuration thereof. Next, the method of producing the steel sheet for containers will be described in detail below.

Before the method of forming the chemical conversion coating layer of the invention, the above-mentioned tin melting treatment, which is performed after the steel sheet or the steel sheet plated with a nickel based material is plated with tin, will be briefly described.

Also called reflow treatment, tin melting treatment is performed after Sn-plating to provide surface luster by raising the temperature to 232° C., the melting point of Sn, or higher in order to melt the Sn in the surface. Tin melting treatment is performed also to improve corrosion resistance of the alloy layer by melting the Sn in the surface to alloy the Sn with a base steel sheet or a base metal to form a Sn—Fe alloy layer or a Sn—Fe—Ni alloy layer. Further, through appropriate control of the tin melting treatment, Sn islands can be formed. Thus there is produced a steel sheet having a plated structure exposing an Fe—Ni alloy plating layer containing no Sn metal and excellent in terms of organic resin adhesion or exposing an Fe—Ni—Sn alloy plating layer.

Tin melting treatment is carried out by heating as evenly as possible at a high temperature of 232° C., the melting point of Sn, or higher, preferably about 240° C. in seconds (e.g., in 10 seconds or less) and, upon obtaining metallic luster, quickly cooling with, for example, cold water (e.g., about 50° C.) to near room temperature.

<Method of Producing Steel Sheet for Containers>

The method of producing a steel sheet for containers according to the invention comprises applying low temperature cathode electrolysis treatment to a plated steel sheet formed with a base plating layer as described above on at least one side of the steel sheet and forming a chemical conversion coating layer as described above on the base plating layer. Formation of such a chemical conversion coating layer may be achieved by, for example, a method whereby a steel sheet is immersed in an acid solution having, for example, zirconium ions, phosphate ions, or low molecular weight phenolic resin dissolved therein or a method using such acid solution to carry out cathode electrolysis treatment.

The above treatment method by immersion is industrially disadvantageous because a steel sheet or a plating layer formed on the surface of the steel sheet serving as a base for the chemical conversion coating layer is etched and various kinds of coatings are formed, resulting in a chemical conversion coating layer inconsistent in the amount of attached coating and, moreover, a longer treatment time required to form the chemical conversion coating layer.

The cathode electrolysis treatment, on the other hand, is industrially a very advantageous method because surface cleaning achieved by forced charge transfer and generation of hydrogen in the steel sheet interface combines with attachment promoting effects produced by an increase in hydrogen ion concentration (pH) to enable formation of a uniform coating achieved through a quick treatment accomplished in a matter of seconds (which can be about 0.01 seconds in some cases). Accordingly, the cathode electrolysis treatment is preferable for forming the chemical conversion coating layer in the method of producing the steel sheet for containers of the invention.

(Components of Chemical Conversion Treatment Solution Used for Cathode Electrolysis Treatment)

To form the chemical conversion coating layer by cathode electrolysis treatment, the components of the chemical conversion treatment solution used for the cathode electrolysis treatment need to be determined according to the kind of coating desired to be formed among zirconium coating, phosphoric acid coating, and phenolic resin coating that may be included in the above chemical conversion coating layer. Specifically, where the chemical conversion coating layer including only a zirconium coating is to be formed, a chemical conversion treatment solution containing zirconium ions in an amount of 100 ppm by mass to 7500 ppm by mass in an acid solution may be used; where the chemical conversion coating layer including a zirconium coating and a phosphoric acid coating is to be formed, a chemical conversion treatment solution containing zirconium ions in an amount of 100 ppm by mass to 7500 ppm by mass and phosphate ions in an amount of 50 ppm by mass to 5000 ppm by mass in an acid solution may be used; and where the chemical conversion coating layer including a zirconium coating, a phosphoric acid coating, and a phenolic resin coating is to be formed, a chemical conversion treatment solution containing zirconium ions in an amount of 100 ppm by mass to 7500 ppm by mass, phosphate ions in an amount of 50 ppm by mass to 5000 ppm by mass and a low molecular weight phenolic resin having a mass-average molecular weight of about 5000 in an amount of 10 ppm by mass to 1500 ppm by mass in an acid solution may be used.

The acid solution used as a chemical conversion treatment solution for the above cathode electrolysis treatment may be added with tannic acid. Tannic acid added to the treatment solution binds with iron atoms in the steel sheet surface to form a coating of iron tannate on the steel sheet surface, improving corrosion resistance and adhesion. Therefore, where the steel sheet for containers of the invention is used in applications where corrosion resistance and adhesion are important, the chemical conversion coating layer may be formed in an acid solution added with tannic acid as necessary.

The solvent used for the acid solution employed to form the chemical conversion coating layer of the invention may be, for example, distilled water. The solvent of the above acid solution is not limited to the one described above and may be selected as appropriate according to, for example, the material dissolved, the formation method used, and the conditions for forming the chemical conversion coating layer. Considering consistent industrial productivity based on consistency in the amounts of attached components, costs, and environment, distilled water is preferably used.

In a chemical conversion treatment solution used to form the chemical conversion treatment layer of the invention, one may use, for example, a Zr complex such as $H_2ZrF_6$ as a Zr supply source. Increase in pH at the cathode electrode interface causes hydrolysis reaction, causing Zr of a Zr complex as described above to become $Zr^{4+}$ and exist as such in the chemical conversion solution. Such Zr ions quickly undergo reaction in the chemical conversion treatment solution to become compounds such as, for example, $ZrO_2$, $Zr_3(PO_4)_4$, and $Zr(HPO_3)_2$, which can form a Zr coating through, for example, dehydration synthesis reaction with hydroxy group (—OH) existing in the metal surface. When phenolic resin is added to the chemical conversion treatment solution, the phenolic resin may be provided with water solubility by, for example, subjecting phenolic resin to amino alcohol denaturation. Further, the chemical conversion treatment solution may be added with, for example, nitric acid or ammonia to adjust the pH value thereof.

(Cathode Electrolysis Conditions)

Cathode electrolysis treatment for forming the chemical conversion coating layer of the invention is preferably performed intermittently by alternately connecting and disconnecting electric current used in the chemical conversion treatment solution having a temperature (bath temperature) of 20° C. to 50° C. A range of 40° C. to 50° C., in particular, is preferable.

Further, the above cathode electrolysis treatment is performed preferably at an electrolytic current density of 0.01 A/dm$^2$ to 20 A/dm$^2$. In particular, a range of 0.5 A/dm$^2$ to 10 A/dm$^2$ is preferable to obtain a steel sheet having still better film adhesion. Where the electrolytic current density is less than 0.01 A/dm$^2$, the amount of attached coating decreases, consistent coating formation becomes difficult, the electrolysis treatment may require a long period of time, reducing productivity, and corrosion resistance and paint adhesion, for example, may decrease. When, on the other hand, the electrolytic current density exceeds 20 A/dm$^2$, the amount of attached coating exceeds a required amount and becomes saturated, causing, in some cases, the poorly attached the coating to be washed away (detached) in the cleaning step using, for example, water following the chemical conversion treatment by electrolysis, which is not economical. The temperature of the chemical conversion treatment solution also is thereby increased during the electrolysis treatment, which may in some cases necessitate cooling of the chemical conversion treatment solution in order to maintain the above temperature conditions for the low-temperature cathode electrolysis treatment.

Preferably, the above cathode electrolysis treatment is performed twice or preferably four times or more, through intermittent energization with a total energization time of 0.5 seconds to 10 seconds. The deposited particles having a desired diameter are difficult to form through continuous energization applied only once but can be efficiently formed through intermittent electrolysis carried out with intervals during which no current is applied and are consistently formed through intermittent energization conducted at least twice, preferably at least four times. This is because it is inferred that the deposition site of deposited particles is formed during the non-energization intervals. The non-energization interval is preferably 0.1 seconds to 2 seconds.

With a total energization time of less than 0.5 seconds, the growth of the deposited particles does not take place easily, making it difficult to form a coating with a desired diameter distribution. With an energization time of over 10 seconds, the amount of attached coating exceeds a required amount, and the amount of attachment becomes saturated, causing, in some cases, the poorly attached coating to be washed away (detached) in the cleaning step using, for example, water following the chemical conversion treatment performed using electrolysis, which is not economical, while the temperature of the chemical conversion treatment solution also is thereby increased, which may in some cases necessitate cooling of the chemical conversion treatment solution in order to maintain the above temperature conditions for the low-temperature cathode electrolysis treatment.

Through the cathode electrolysis treatment performed at the electrolytic current density, with energization being repeated a certain number of times, and for the energization time as described above, an appropriate amount of attached coating can be formed on the steel sheet surface.

EXAMPLES

The present invention is described more specifically below with reference to examples and comparative examples, but the invention is by no means limited to the examples below.
<Production of Steel Sheet>
First, a steel sheet for forming the chemical conversion coating layer thereon was produced by a method described below.

(A1; Method of Producing a Steel Sheet Having Ni Plating Layer and Sn Plating Layer)
A steel base material (steel sheet) subjected to annealing and temper rolling after cold rolling and having a thickness of 0.17 mm to 0.23 mm was degreased, pickled, then allowed to undergo plating with Ni using a Watts bath, followed by plating with Sn using a ferrostan bath, and subsequently subjected to tin melting treatment to produce an Ni- and Sn-plated steel sheet having a Sn alloy layer.

(A2: Method of Producing a Steel Sheet Having Sn Plating Layer)
A cold-rolled, and then annealed and temper-rolled steel base material (steel sheet) having a thickness of 0.17 mm to 0.23 mm was degreased, pickled, then allowed to undergo plating with Sn using a ferrostan bath, and subsequently subjected to tin melting treatment to produce a composite plated steel sheet having a Sn alloy layer.

(A3: Method of Producing a Steel Sheet Having Sn Plating Layer of Al Alloyed)
A cold-rolled steel base material (steel sheet) having a thickness of 0.17 mm to 0.23 mm was degreased, pickled, then Ni-plated using a Watts bath, followed by annealing during which a Ni diffusion layer was formed, degreased and pickled, plated with Sn using a ferrostan bath, and subsequently subjected to tin melting treatment to produce a Ni- and Sn-plated steel sheet having an Sn alloy layer.

(A4: Method of Producing a Steel Sheet Having Ni Plating Layer)
A cold-rolled, and then annealed and temper-rolled steel base material (steel sheet) having a thickness of 0.17 mm to 0.23 mm was degreased, pickled, and thereafter allowed to undergo plating with Ni on both sides thereof using a Watts bath to produce an Ni-plated steel sheet (A4).

Minimum values, optimum values, and maximum values of the amounts of attachment of nickel metal and tin metal in (A1) to (A4) above are as shown in Table 1.

TABLE 1

|  | Amount of metal nickel (mg/m$^2$) (minimum-optimum-maximum) | Amount of metal tin (mg/m$^2$) (minimum-optimum-maximum) |
| --- | --- | --- |
| A1 | 5-40-150 | 300-1000-3000 |
| A2 | — | 100-2800-5600 |
| A3 | 5-70-150 | 300-1000-3000 |
| A4 | 20-500-950 | — |

Next, steel sheets respectively produced by the methods (A1) to (A4) above were formed on a surface (both sides) thereof with a Zr coating, a phosphoric acid coating, and a phenolic resin coating (B1); a Zr coating and a phosphoric acid coating (B2); a phosphoric acid coating and a phenolic resin, coating (B3); and a Zr coating and a phenolic resin coating (B4) by the respective methods described below. Further, tannic acid was added to the electrolysis treatment solution to form a chemical conversion coating layer composed of a Zr coating and a phosphoric acid coating (B5).

(B1) The steel sheets produced by the methods (A1) to (A4) above were immersed in a treatment solution prepared by dissolving zirconium fluoride, phosphoric acid, and phenolic resin in distilled water for cathode electrolysis treatment, rinsed with water, and dried.

(B2) The steel sheets produced by the methods (A1) to (A4) above were immersed in a treatment solution prepared by dissolving zirconium fluoride and phosphoric acid in distilled water, for cathode electrolysis treatment, washed with water, and dried.

(B3) The steel sheets produced by the methods (A1) to (A4) above were immersed in a treatment solution prepared by dissolving phosphoric acid and phenolic resin in distilled water for cathode electrolysis treatment, washed with water, and dried.

(B4) The steel sheets produced by the methods (A1) to (A4) above were immersed in a treatment solution prepared by dissolving zirconium fluoride and phenolic resin in distilled water for cathode electrolysis treatment, washed with water, and dried.

(B5) The steel sheets produced by the methods (A1) to (A4) above were immersed in a treatment solution prepared by dissolving zirconium fluoride, phosphoric acid, and tannic acid in distilled water for cathode electrolysis treatment, washed with water, and dried.

The components of the chemical conversion treatment solutions used in (B1) to (B5) above are as shown in Table 2.

TABLE 2

| Ions (ppm by mass) | B1 | B2 | B3 | B4 | B5 |
|---|---|---|---|---|---|
| Zr | 1500 | 1500 | — | 1200 | 1200 |
| $PO_4$ | 1000 | 950 | 18000 | — | 600 |
| F | 1600 | 1900 | — | 1400 | 1800 |
| $NO_3$ | 1300 | 1700 | — | — | 2200 |
| $NH_4$ | 1000 | 1000 | — | — | 500 |
| Phenolic resin | 1000 | — | 44000 | 800 | — |
| Tannic acid | — | — | — | — | 1000 |

The amounts of Zr metal and P in the chemical conversion coating layers of the respective steel sheets for containers were measured by quantitative analysis using fluorescent X-ray analysis. The amount of carbon in the chemical conversion coating layers was obtained by subtracting the amount of carbon contained in each steel sheet as background from a value obtained by total carbon measurement using gas chromatography.

<Evaluation Method>

Next, the steel sheets for containers produced by the above methods were evaluated as specimens of working examples of the invention and comparative examples for properties including film adhesion, external appearances, and corrosion resistance. Specific evaluation methods and evaluation standards are described below.

(1) Film Adhesion

Both sides of each of the specimens of the working examples and the comparative examples were laminated with a 20-μm-thick PET film at 200° C. and subjected to drawing and ironing to produce a can body, which then underwent a necking process before being immersed in water and subjected to a 60-minute retorting treatment at 130° C. to carry out evaluation of the state of detachment of the film in the neck portion of the container.

Specimens with no detachment were marked ⊚; specimens with slight detachment posing no practical problem in use were marked ◯; specimens with partial detachment posing practical problems in use were marked Δ; and specimens with detachment in most parts were marked X. The results are all shown in Table 3. For practical use, ratings represented by "◯" and "⊚" are required.

(2) External Appearances

The specimens of the working examples and the comparative examples were visually observed. Specimens that exhibited a sufficiently light color tone for practical use with no black patches observed on the chemical conversion coating layer were marked ⊚; specimens that exhibited a color tone with lightness posing no practical problem in use, with very few black patches, were marked ◯; specimens where the occurrence of only a few black patches was observed, with a darkness posing practical problems, were marked Δ; specimens that exhibited a significantly dark color tone and where the occurrence of black patches was observed were marked X.

For practical use, ratings represented by "◯" and "⊚" are required.

The results are shown in Table 3. Table 3 below also shows the amounts of the plating layers and the amounts of coatings attached to the specimens in the working examples and the comparative examples. The amounts of Ni and Sn shown in Table 3 were obtained by fluorescent X-ray measurement; as regards the amounts of attached coatings, fluorescent X-ray quantitative analysis was used to obtain the amounts of the Zr coatings (amounts of Zr) and the amounts of phosphoric acid coatings (amount of P), while total carbon measurement employing gas chromatography was used to obtain the amounts of phenolic resin coatings (amounts of C) (the amounts of C contained in the steel were subtracted as background).

Where energization was repeated a plurality of times, the interval at which no electric current was applied was 0.5 seconds.

The treatment surfaces were observed with an SEM to obtain the value of $\{(a+b)/2\}$ (nm) as the diameter (nm) of particles in the coating contained in the examples, where a (nm) is the length of the major axis, which is the line segment having the maximum length among line segments each connecting one end and the other end of any given particle; and b (nm) is the length of the minor axis, which is the line segment having the maximum length among the line segments each connecting one end and another end of the particle and crossing the major axis at right angles.

The area ratio of the area of particles satisfying $\{(a+b)/2\}>200$ nm at the surface of the chemical conversion coating layer was obtained from an SEM photograph for observation (10 μm×10 μm).

The maximum value of $\{(a+b)/2\}$ in each example described later was 1000 nm or less; in particular, in examples where the area ratio of particles A was 20% or less, the maximum value of $\{(a+b)/2\}$ was 450 nm.

(3) Corrosion Resistance

Each of the test materials in the working examples was applied with an epoxy phenolic resin on one side thereof and then kept at a temperature of 200° C. for 30 minutes for baking. The material then had a cross cut made in the resin-applied portion thereof to a depth reaching the steel base material, was immersed in a test solution containing citric acid (1.5% by mass) and salt (1.5% by mass) mixed in the test solution at a temperature of 45° C. for 72 hours, washed and dried, before undergoing a tape peeling test to carry out evaluation based on the state of corrosion under the applied coating (epoxy-phenolic resin coating) at the cross cut and the state of corrosion on the flat portion.

The results revealed that no corrosion was observed under the applied coating in the working examples, proving that there is excellent corrosion resistance.

TABLE 3

| | | | Steel sheet | | | Chemical conversion coating layer | | | |
|---|---|---|---|---|---|---|---|---|---|
| | No. | Treatment | Ni [mg/m$^2$] | Sn [mg/m$^2$] | State of Sn islands | Treatment | Electrolysis temperature (° C.) | Current density [A/dm$^2$] | Energization [times] |
| Example | 1 | A1 | 10 | 1000 | ○ | B1 | 45 | 0.06 | 2 |
| Example | 2 | A1 | 140 | 2000 | ○ | B1 | 45 | 0.35 | 4 |
| Example | 3 | A1 | 50 | 400 | ○ | B1 | 45 | 1 | 4 |
| Example | 4 | A1 | 40 | 2800 | ○ | B1 | 45 | 1.5 | 8 |
| Example | 5 | A1 | 40 | 1000 | ○ | B2 | 45 | 0.07 | 2 |
| Example | 6 | A1 | 40 | 1000 | ○ | B2 | 45 | 1.1 | 8 |
| Example | 7 | A1 | 40 | 1000 | ○ | B2 | 45 | 2.7 | 4 |
| Example | 8 | A1 | 40 | 1000 | ○ | B3 | 45 | 0.14 | 4 |
| Example | 9 | A1 | 50 | 2800 | ○ | B3 | 45 | 2.6 | 8 |
| Example | 10 | A1 | 100 | 1400 | ○ | B4 | 45 | 0.1 | 2 |
| Example | 11 | A1 | 30 | 1500 | ○ | B4 | 45 | 0.8 | 4 |
| Example | 12 | A1 | 70 | 1200 | ○ | B4 | 45 | 0.7 | 8 |
| Example | 13 | A1 | 100 | 1400 | ○ | B5 | 45 | 0.1 | 3 |
| Example | 14 | A1 | 40 | 2800 | ○ | B5 | 45 | 1 | 8 |
| Example | 15 | A2 | — | 200 | — | B1 | 45 | 0.3 | 4 |
| Example | 16 | A2 | — | 2800 | — | B1 | 45 | 2.3 | 4 |
| Example | 17 | A2 | — | 2500 | — | B1 | 45 | 1.7 | 8 |
| Example | 18 | A2 | — | 2500 | — | B2 | 45 | 0.1 | 2 |
| Example | 19 | A2 | — | 2500 | — | B2 | 45 | 1 | 4 |
| Example | 20 | A2 | — | 2500 | — | B2 | 45 | 0.8 | 8 |
| Example | 21 | A2 | — | 3400 | — | B3 | 45 | 0.1 | 2 |
| Example | 22 | A2 | — | 5300 | — | B3 | 45 | 5.7 | 4 |
| Example | 23 | A2 | — | 2400 | — | B4 | 45 | 0.05 | 2 |
| Example | 24 | A2 | — | 2400 | — | B4 | 45 | 2.9 | 8 |
| Example | 25 | A2 | — | 400 | — | B5 | 45 | 0.1 | 2 |
| Example | 26 | A2 | — | 400 | — | B5 | 45 | 1.6 | 8 |
| Example | 27 | A3 | 70 | 1000 | ○ | B1 | 45 | 0.3 | 4 |
| Example | 28 | A3 | 70 | 1000 | ○ | B2 | 45 | 2 | 4 |
| Example | 29 | A3 | 70 | 1000 | ○ | B3 | 45 | 1 | 4 |
| Example | 30 | A3 | 70 | 1000 | ○ | B4 | 45 | 2.3 | 4 |
| Example | 31 | A3 | 70 | 1000 | ○ | B5 | 45 | 1.7 | 4 |
| Example | 32 | A4 | 30 | — | — | B1 | 45 | 0.9 | 4 |
| Example | 33 | A4 | 300 | — | — | B1 | 45 | 2.9 | 4 |
| Example | 34 | A4 | 440 | — | — | B2 | 45 | 0.6 | 4 |
| Example | 35 | A4 | 500 | — | — | B2 | 45 | 1.3 | 8 |
| Example | 36 | A4 | 900 | — | — | B3 | 45 | 0.4 | 4 |
| Example | 37 | A4 | 900 | — | — | B3 | 45 | 4.6 | 4 |
| Example | 38 | A4 | 730 | — | — | B4 | 45 | 0.2 | 2 |
| Example | 39 | A4 | 730 | — | — | B4 | 45 | 2.9 | 8 |
| Example | 40 | A4 | 130 | — | — | B5 | 45 | 0.8 | 4 |
| Example | 41 | A4 | 130 | — | — | B5 | 45 | 2.4 | 4 |
| Compar. Ex. | 1 | A1 | 10 | 1000 | ○ | B1 | 20 | 1.2 | 1 |
| Compar. Ex. | 2 | A1 | 40 | 1000 | ○ | B2 | 30 | 0.05 | 1 |
| Compar. Ex. | 3 | A2 | — | 2800 | — | B3 | 30 | 4.8 | 1 |
| Compar. Ex. | 4 | A3 | 70 | 900 | ○ | B4 | 30 | 1.5 | 1 |
| Compar. Ex. | 5 | A3 | 60 | 1200 | ○ | B5 | 20 | 2 | 1 |
| Compar. Ex. | 6 | A2 | — | 2800 | — | B1 | 45 | 0 | 0 |
| Compar. Ex. | 7 | A1 | 10 | 1000 | ○ | B1 | 45 | 2 | 8 |
| Compar. Ex. | 8 | A2 | — | 2500 | — | B2 | 45 | 0.02 | 2 |
| Compar. Ex. | 9 | A2 | — | 2500 | — | B2 | 45 | 5.9 | 8 |
| Compar. Ex. | 10 | A4 | 900 | — | — | B3 | 45 | 0.02 | 2 |
| Compar. Ex. | 11 | A1 | 40 | 1000 | ○ | B3 | 45 | 9.1 | 8 |
| Compar. Ex. | 12 | A1 | 50 | 2800 | ○ | B5 | 45 | 0.02 | 2 |
| Compar. Ex. | 13 | A4 | 900 | — | — | B3 | 45 | 8.1 | 8 |

| | | Chemical conversion coating layer | | | | Evaluation | |
|---|---|---|---|---|---|---|---|
| | No. | Total energization time [sec] | Adhered Zr (mg/m$^2$) | Adhered P (mg/m$^2$) | Adhered C (mg/m$^2$) | Area ratio (%) | Film adhesion | External appearances |
| Example | 1 | 1 | 0.2 | 0.1 | 0.1 | 0.2 | ○ | ◎ |
| Example | 2 | 2 | 2.1 | 0.8 | 0.6 | 9 | ◎ | ◎ |
| Example | 3 | 2 | 5.9 | 2.4 | 1.4 | 19 | ◎ | ○ |
| Example | 4 | 2 | 8.9 | 3.9 | 2.3 | 48 | ○ | ○ |
| Example | 5 | 1 | 0.2 | 0.1 | — | 0.8 | ○ | ◎ |
| Example | 6 | 2 | 6.1 | 2.9 | — | 34 | ○ | ○ |
| Example | 7 | 2 | 9 | 7.8 | — | 48 | ○ | ○ |
| Example | 8 | 1 | — | 0.2 | 0.1 | 2 | ○ | ◎ |
| Example | 9 | 2 | — | 7.8 | 7.6 | 43 | ○ | ○ |
| Example | 10 | 1 | 0.3 | — | 0.2 | 0.6 | ○ | ◎ |
| Example | 11 | 2 | 5 | — | 3.7 | 18 | ◎ | ○ |
| Example | 12 | 4 | 8.7 | — | 7.6 | 46 | ○ | ○ |

TABLE 3-continued

| | | | | | | | | |
|---|---|---|---|---|---|---|---|---|
| Example | 13 | 3 | 0.9 | 0.4 | 0.1 | 3 | ◎ | ◎ |
| Example | 14 | 2 | 5.2 | 2.2 | 4.7 | 31 | ○ | ○ |
| Example | 15 | 2 | 2.2 | 0.9 | 0.9 | 0.6 | ○ | ◎ |
| Example | 16 | 1 | 6.3 | 3.3 | 1.3 | 34 | ○ | ○ |
| Example | 17 | 2 | 8.6 | 4.6 | 2.8 | 47 | ○ | ○ |
| Example | 18 | 1 | 0.3 | 0.1 | — | 0.5 | ○ | ◎ |
| Example | 19 | 2 | 5.8 | 2.5 | — | 25 | ○ | ○ |
| Example | 20 | 4 | 8.8 | 7.3 | — | 45 | ○ | ○ |
| Example | 21 | 1 | — | 0.2 | 0.05 | 0.3 | ○ | ◎ |
| Example | 22 | 1 | — | 7.4 | 7.6 | 39 | ○ | ○ |
| Example | 23 | 1 | 0.2 | — | 0.1 | 2 | ○ | ◎ |
| Example | 24 | 1 | 8.4 | — | 7.2 | 42 | ○ | ○ |
| Example | 25 | 1 | 0.3 | 0.2 | 0.3 | 0.4 | ○ | ◎ |
| Example | 26 | 2 | 8.6 | 6.3 | 7.8 | 45 | ○ | ○ |
| Example | 27 | 2 | 2.2 | 0.9 | 0.9 | 0.6 | ○ | ◎ |
| Example | 28 | 1 | 5.7 | 3.2 | — | 9 | ◎ | ◎ |
| Example | 29 | 2 | — | 2.8 | 1.4 | 19 | ○ | ○ |
| Example | 30 | 1 | 6.5 | — | 3.2 | 31 | ○ | ○ |
| Example | 31 | 1 | 3.5 | 2.1 | 1.8 | 13 | ◎ | ○ |
| Example | 32 | 2 | 4 | 2.5 | 0.9 | 3 | ◎ | ◎ |
| Example | 33 | 1 | 7.8 | 5.3 | 3.2 | 39 | ○ | ○ |
| Example | 34 | 1 | 1.8 | 1.1 | — | 14 | ◎ | ○ |
| Example | 35 | 2 | 7.6 | 5.6 | — | 35 | ○ | ○ |
| Example | 36 | 1 | — | 0.6 | 0.4 | 7 | ○ | ○ |
| Example | 37 | 1 | — | 6.8 | 3.4 | 33 | ○ | ○ |
| Example | 38 | 1 | 0.5 | — | 0.3 | 4 | ◎ | ◎ |
| Example | 39 | 1 | 8.1 | — | 6.4 | 41 | ○ | ○ |
| Example | 40 | 1 | 2.2 | 1.1 | 0.8 | 14 | ◎ | ○ |
| Example | 41 | 1 | 6.9 | 4.1 | 2.8 | 31 | ○ | ○ |
| Compar. Ex. | 1 | 1 | 3.4 | 1.6 | 0.9 | 0 | Δ | ◎ |
| Compar. Ex. | 2 | 2 | 0.2 | 0.1 | — | 0 | Δ | ◎ |
| Compar. Ex. | 3 | 1 | — | 7.8 | 4.5 | 0 | X | ◎ |
| Compar. Ex. | 4 | 2 | 8.8 | — | 7.8 | 0 | Δ | ◎ |
| Compar. Ex. | 5 | 1 | 5.7 | 2.1 | 1.3 | 0 | Δ | ◎ |
| Compar. Ex. | 6 | 3 (immersed) | 0.1 | 0.1 | 0.04 | 0.08 | X | ◎ |
| Compar. Ex. | 7 | 2 | 9 | 4.9 | 3.2 | 56 | Δ | Δ |
| Compar. Ex. | 8 | 1 | 0.08 | 0.05 | — | 1 | X | ◎ |
| Compar. Ex. | 9 | 1.2 | 14 | 6.9 | — | 56 | Δ | X |
| Compar. Ex. | 10 | 1 | — | 0.05 | 0.04 | 0.1 | X | ◎ |
| Compar. Ex. | 11 | 1 | — | 8.1 | 8.2 | 52 | X | Δ |
| Compar. Ex. | 12 | 1 | 0.2 | 0.08 | 0.03 | 1 | X | ◎ |
| Compar. Ex. | 13 | 1 | — | 7.9 | 8.9 | 64 | Δ | X |

In Comparative Example 6, the chemical conversion coating layer was formed by immersion treatment instead of electrolysis treatment.

As shown in Table 3, Examples 1 to 41, where the amounts of attachment of Zr, P, and C and the area ratio of particles having a given size are within the ranges of the invention, exhibited excellent film adhesion and external properties. The corrosion resistance was also excellent.

In particular, where the steel sheets were treated by any of the methods A1, A3, and A4, still better film adhesion was observed with the area ratio in a range of 1% to 20%. When the area ratio was 10% or less, still better external properties were observed.

On the other hand, Comparative Examples 1 to 5 respectively corresponding to Examples 1, 8, 34, 50, and 52 disclosed in Patent Literature 1 were inferior in film adhesion.

When the amounts of attachment of Zr, P, and C and the area ratio of particles having a given size are outside the ranges of the invention as shown in Comparative Examples 6 to 13, film adhesion or external properties were inferior.

While the present invention is described above by way of preferred embodiments, the invention is not limited to these examples. A person skilled in the art would obviously conceive of various modifications and corrections within the ranges described in Claims, and it is to be understood that all such changes and modifications also fall as a matter of course within the technical scope of the invention.

The invention claimed is:

1. A steel sheet for containers comprising:

on at least one side of the steel sheet, a chemical conversion coating layer consisting of a zirconium component containing 0.1 mg/m$^2$ to 4 mg/m$^2$ of zirconium in terms of zirconium metal, a phosphoric acid component containing 0.1 mg/m$^2$ to 2.5 mg/m$^2$ of phosphate in terms of phosphorus, and a phenolic resin component containing 0.05 mg/m to 0.9 mg/m$^2$ of phenolic resin in terms of carbon, wherein the chemical conversion coating is formed by cathode electrolysis treatment with a chemical conversion treatment solution containing zirconium ions, phosphate ions and phenolic resin, wherein an area ratio of particles derived from the chemical conversion treatment solution satisfying $\{(a+b)/2\}>200$ (nm) at a surface of the chemical conversion coating layer is 1% to 20%, where a (nm) is the length of the major axis, which is the line segment having the maximum length among line segments connecting one end and another end of any given particle in the chemical conversion coating layer, and b (nm) is the length of the minor axis, which is the line segment having the maximum length among line segments connecting one end and another end of the particle and crossing the major axis at right angles, wherein the steel sheet comprises on at least one side thereof a nickel plating layer containing 10 mg/m² to 1000 mg/m² of nickel in terms of nickel metal, and wherein the nickel plating layer is provided thereon with the chemical conversion coating layer.

* * * * *